United States Patent
Sugano

(10) Patent No.: US 11,383,737 B2
(45) Date of Patent: Jul. 12, 2022

(54) AUTOMATIC PARKING SYSTEM

(71) Applicant: Toyota Jidosha Kabushiki Kaisha, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 16/889,250

(22) Filed: Jun. 1, 2020

(65) Prior Publication Data
US 2021/0078601 A1 Mar. 18, 2021

(30) Foreign Application Priority Data
Sep. 17, 2019 (JP) .............................. JP2019-168408

(51) Int. Cl.
| | |
|---|---|
| *B60W 30/06* | (2006.01) |
| *B60W 60/00* | (2020.01) |
| *B62D 15/02* | (2006.01) |
| *G05D 1/02* | (2020.01) |
| *G08G 1/00* | (2006.01) |
| *G08G 1/14* | (2006.01) |

(52) U.S. Cl.
CPC ........ *B60W 60/0025* (2020.02); *B60W 30/06* (2013.01); *G08G 1/146* (2013.01); *G08G 1/149* (2013.01); *G08G 1/22* (2013.01)

(58) Field of Classification Search
CPC .............. B60W 60/00; B60W 60/001; B60W 60/0025; B60W 30/00; B60W 30/06; G08G 1/00; G08G 1/14; G08G 1/141; G08G 1/145; G08G 1/146; G08G 1/22; G08G 1/149; G08G 1/143; G08G 1/148; G05D 2201/00; G05D 2201/02; G05D 2201/0213; G05D 1/02; G05D 1/021; G05D 1/0287; G05D 1/0291; G05D 1/0297; B62D 15/00; B62D 15/02; B62D 15/027; B62D 15/0285
USPC .......................................................... 701/25
See application file for complete search history.

(56) References Cited

U.S. PATENT DOCUMENTS

| | | | |
|---|---|---|---|
| 2019/0012916 A1 | 1/2019 | Nordbruch | |
| 2019/0382002 A1* | 12/2019 | Yamazaki | ............. B60W 30/06 |
| 2020/0290601 A1* | 9/2020 | Yamanaka | ........ B60W 50/0205 |

FOREIGN PATENT DOCUMENTS

JP 2018-533259 A 11/2018

* cited by examiner

*Primary Examiner* — Khoi H Tran
*Assistant Examiner* — Sarah A Tran
(74) *Attorney, Agent, or Firm* — Dinsmore & Shohl LLP

(57) ABSTRACT

An automatic parking system instructs a plurality of autonomous driving vehicles in a parking lot such that each autonomous driving vehicle travels along a target route and parks in a target parking space within the parking lot. The automatic parking system includes: a vehicle instruction unit configured to direct the autonomous driving vehicle the target route for reaching the target parking space, and to issue a pause instruction and an advance instruction to the autonomous driving vehicle autonomously traveling along the target route. The vehicle instruction unit issues an autonomous travel reservation instruction for causing the autonomous driving vehicle to autonomously travel along the target route when communication with the autonomous driving vehicle is interrupted.

5 Claims, 7 Drawing Sheets

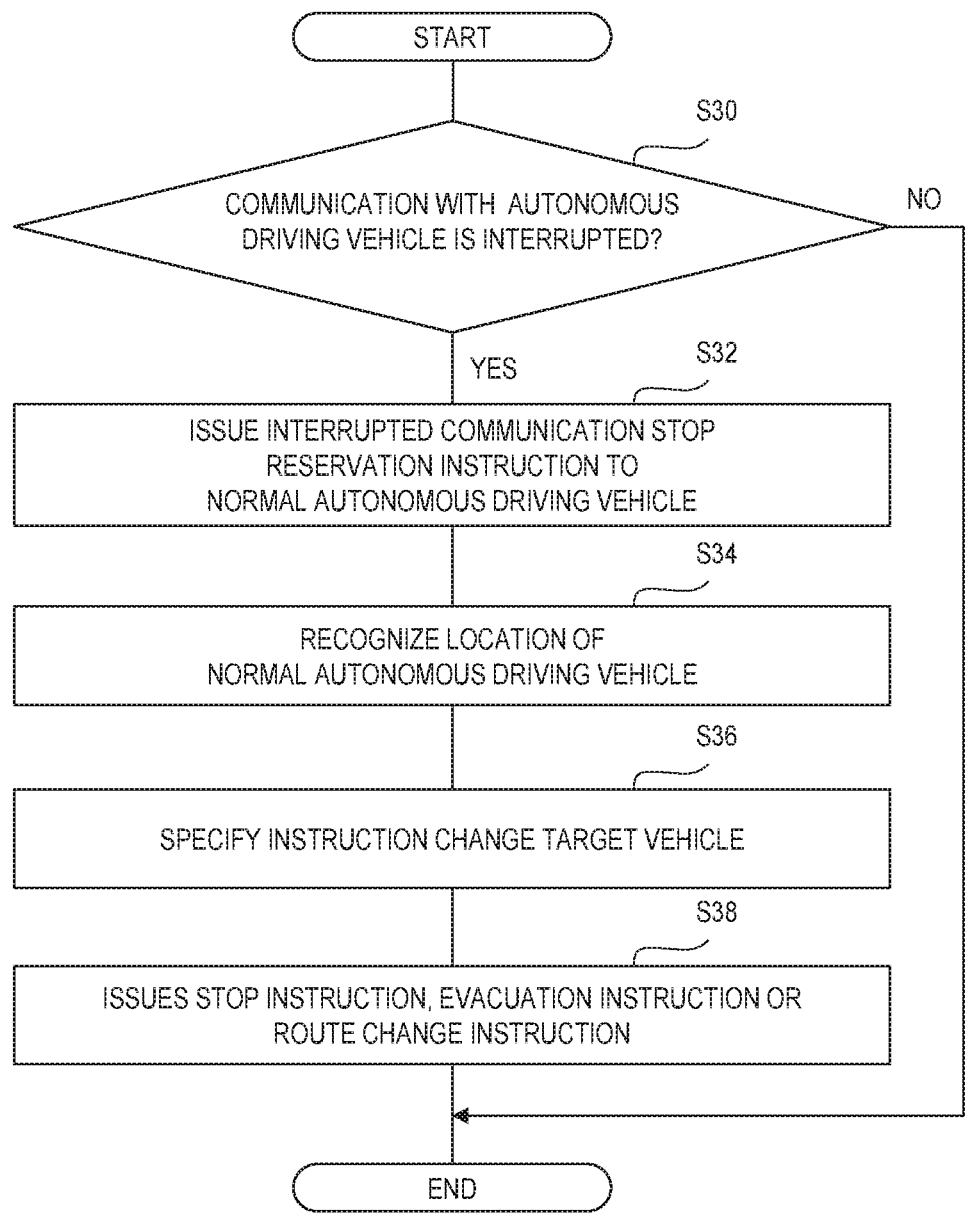

AUTOMATIC PARKING SYSTEM

CROSS-REFERENCE TO RELATED APPLICATION

This application claims priority to Japanese Patent Application No. 2019-168408 filed on Sep. 17, 2019, incorporated herein by reference in its entirety.

BACKGROUND

1. Technical Field

The present disclosure relates to an automatic parking system.

2. Description of Related Art

JP-T-2018-533259 is well-known as a technology related to an automatic parking system. This publication discloses a communication system for performing wireless communication between a parking lot management server and a vehicle, which is used for automatic valet parking and includes a first communication device and a second communication device, using different wireless communication networks, as well as a control device for redundantly operating the first communication device and the second communication device.

SUMMARY

During automatic valet parking an autonomous driving vehicle travels in accordance with an instruction from a parking lot side, however it is difficult to completely prevent a communication interruption between the parking lot and the autonomous driving vehicle. When the communication is interrupted, the autonomous driving vehicle cannot receive the instruction from the parking lot, which reduces the parking efficiency of the automatic valet parking.

An aspect of the present disclosure is an automatic parking system that instructs a plurality of autonomous driving vehicles in a parking lot such that each of the autonomous driving vehicles travels along a target route and parks in a target parking space within the parking lot. The automatic parking system includes a vehicle instruction unit configured to direct the autonomous driving vehicle to the target route, and to issue a pause instruction and an advance instruction to the autonomous driving vehicle traveling along the target route. The vehicle instruction unit is configured to issue an autonomous travel reservation instruction for causing the autonomous driving vehicle to autonomously travel along the target route when communication with the autonomous driving vehicle is interrupted.

With the automatic parking system as set forth in the aspect of the present disclosure, the autonomous travel reservation instruction for causing the autonomous driving vehicle to autonomously travel along the target route is issued when communication is interrupted. Therefore, compared to a case where the autonomous driving vehicle is always stopped when communication is interrupted, it is possible to improve the parking efficiency of the automatic valet parking by causing the autonomous driving vehicle of which communication is interrupted to autonomously travel.

In the automatic parking system according to the aspect of the present disclosure, the vehicle instruction unit may issue, when a failed vehicle that is the autonomous driving vehicle of which communication is interrupted exists, a route change instruction or an evacuation instruction to a normal autonomous driving vehicle that is the autonomous driving vehicle other than the failed vehicle based on a location of the normal autonomous driving vehicle, such that the normal autonomous driving vehicle located on the target route of the failed vehicle travels to get away from the target route of the failed vehicle. With this automatic parking system, by issuing the route change instruction or the evacuation instruction such that the normal autonomous driving vehicle on the target route of the failed vehicle that may autonomously travel to get away from the target route of the failed vehicle, it is less likely that the normal autonomous driving vehicle collides with the failed vehicle.

In the automatic parking system according to the aspect of the present disclosure, the vehicle instruction unit may issue, when a failed vehicle that is the autonomous driving vehicle of which communication is interrupted exists, a route change instruction or a stop instruction to a normal autonomous driving vehicle that is the autonomous driving vehicle other than the failed vehicle based on a location of the normal autonomous driving vehicle, such that the normal autonomous driving vehicle expected to enter the target route of the failed vehicle does not enter the target route of the failed vehicle. With this automatic parking system, by issuing the route change instruction or the stop instruction such that the normal autonomous driving vehicle expected to enter the target route of the failed vehicle that may autonomously travel does not enter the target route of the failed vehicle, it is less likely that the normal autonomous driving vehicle collides with the failed vehicle.

In the automatic parking system according to the aspect of the present disclosure, the vehicle instruction unit may issue, when a failed vehicle that is the autonomous driving vehicle of which communication is interrupted exists, an interrupted communication stop reservation instruction to a normal autonomous driving vehicle that is the autonomous driving vehicle other than the failed vehicle, such that the normal autonomous driving vehicle stops when the communication is interrupted, and the interrupted communication stop reservation instruction may have priority over the autonomous travel reservation instruction. With this automatic parking system, the interrupted communication stop reservation instruction is issued for the normal autonomous driving vehicle when the failed vehicle exists, and the interrupted communication stop reservation instruction has priority, whereby it is possible to prevent the parking lot from becoming overcrowded even when a plurality of failed vehicles autonomously travel.

With the automatic parking system as set forth in the aspect of the present disclosure, it is possible to improve the parking efficiency of the automatic valet parking by causing the autonomous driving vehicle of which communication is interrupted to autonomously travel.

BRIEF DESCRIPTION OF THE DRAWINGS

Features, advantages, and technical and industrial significance of exemplary embodiments of the disclosure will be described below with reference to the accompanying drawings, in which like sings denote like elements, and wherein:

FIG. 7 is a flowchart illustrating one example of an instruction change process in the parking lot management server.

DETAILED DESCRIPTION OF EMBODIMENTS

Hereinafter, embodiments of the present disclosure will be described with reference to drawings.

Figure 1:
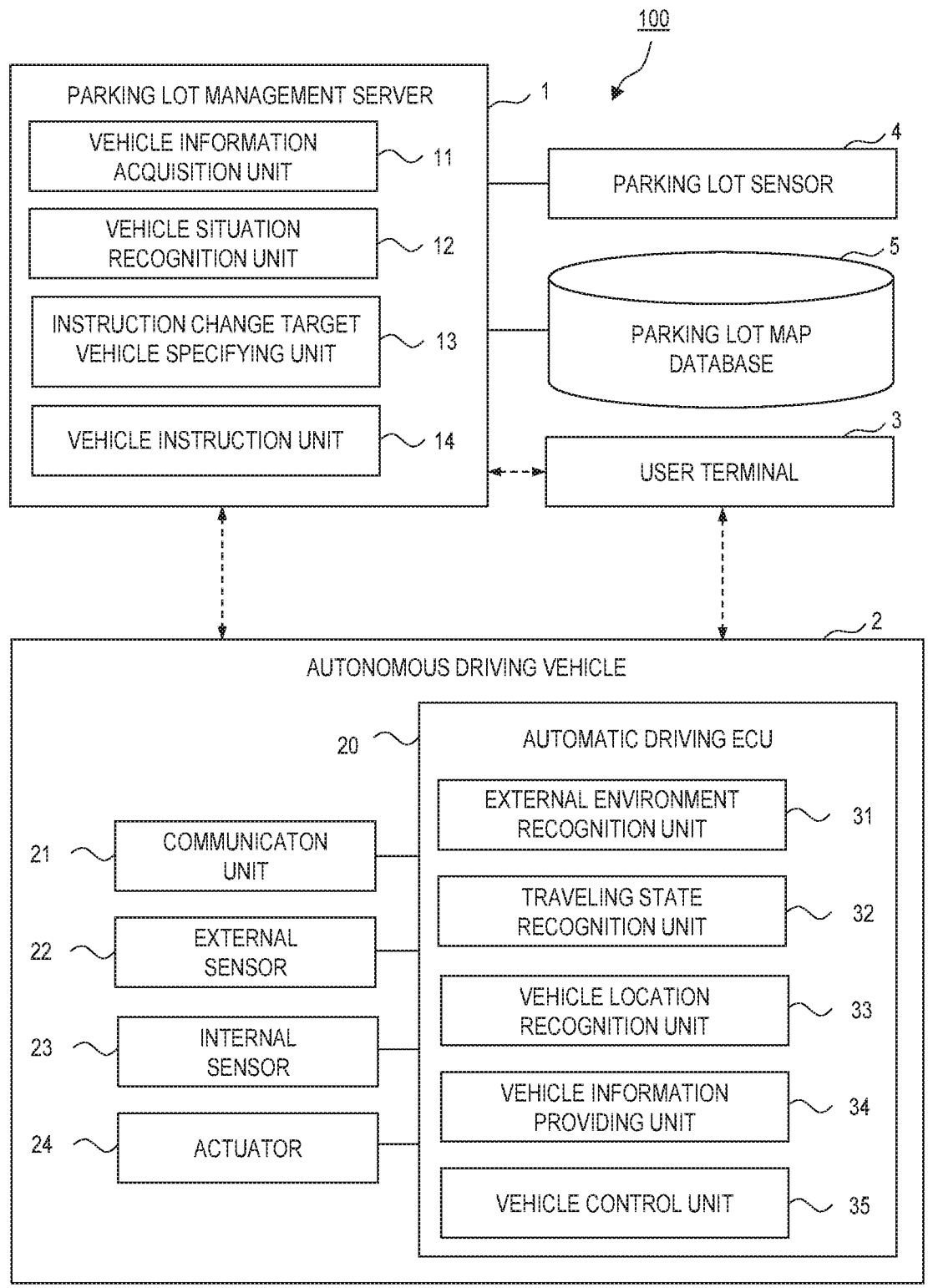
FIG. 1 is a block diagram illustrating a configuration of an automatic parking system according to one embodiment.

FIG. 1 is a block diagram illustrating a configuration of an automatic parking system 100 according to one embodiment. The automatic parking system (or automated valet parking system; AVPS) 100 shown in FIG. 1 is a system for performing automatic valet parking of an autonomous driving vehicle 2 in a parking lot.

The automatic valet parking is a service wherein the unmanned autonomous driving vehicle 2 from which a user (occupant) alights at a drop-off area within a parking lot is directed to travel on a target route so as to be automatically parked in a target parking space within the parking lot. The target parking space is a parking space preset as a parking location of the autonomous driving vehicle 2. The target route is a route within the parking lot, on which the autonomous driving vehicle 2 travels to reach the target parking space. The target route when the vehicle leaves the parking lot is a route that the vehicle travels to reach a pick-up space (described later).

The parking lot may be a parking lot dedicated to the automatic valet parking, or may also serve as a parking lot for general vehicles not subject to the automatic valet parking. A portion of the parking lot for general vehicles may be used as an area exclusively for the automatic valet parking. In the present embodiment, a parking lot dedicated to the automatic valet parking will be explained as an example.

Figure 2:
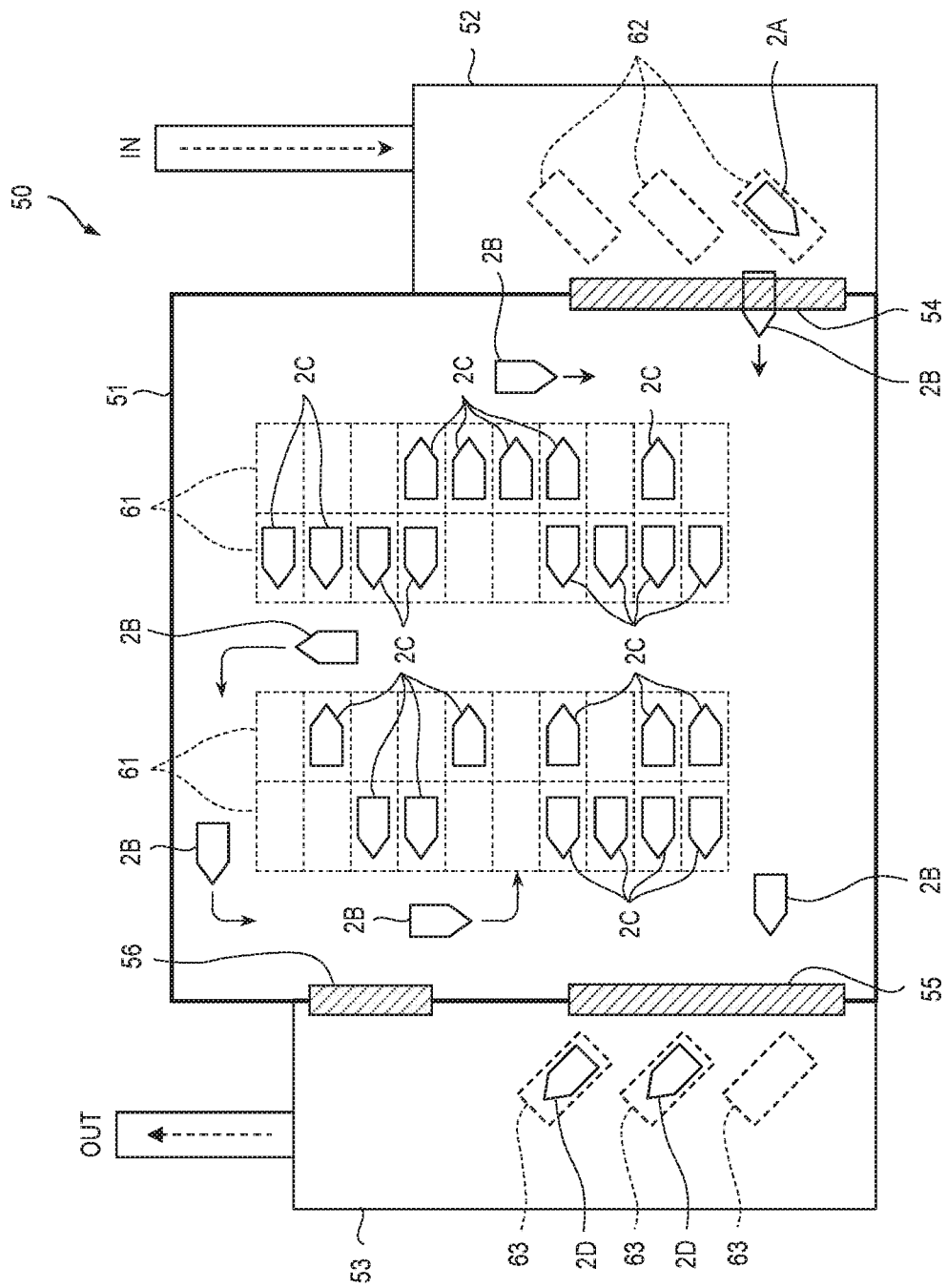
FIG. 2 is a plan view illustrating one example of a parking lot where automatic valet parking is performed.

FIG. 2 is a plan view illustrating one example of a parking lot where the automatic valet parking is performed. FIG. 2 shows a parking lot 50 for the automatic valet parking, a parking area 51, a drop-off area 52, and a pick-up area 53. The parking lot 50 includes the parking area 51, the drop-off area 52 and the pick-up area 53. The drop-off area 52 and the pick-up area 53 do not have to be provided separately, and may be provided as an integrated area.

The parking area 51 is a place where a parking space (parking frame) 61, in which the autonomous driving vehicle 2 is parked by the automatic valet parking, is formed. As shown in FIG. 2, for example, a plurality of parking spaces 61 are formed side by side in one direction (a width direction of the parked vehicle). The drop-off area 52 is provided on an entrance side of the parking lot 50 and is a place where the occupant including the user alights the autonomous driving vehicle 2 before entering the parking area. The drop-off area 52 has a drop-off space 62 for the autonomous driving vehicle 2 to stop when the occupant is to alight the vehicle. The drop-off area 52 is connected to the parking area 51 via an entrance gate 54.

The pick-up area 53 is provided on an exit side of the parking lot 50 and is a place where the occupant boards the autonomous driving vehicle 2 that leaves the parking lot. The pick-up area 53 has a pick-up space 63 for the autonomous driving vehicle 2 to wait for the occupant to board the vehicle. The pick-up area 53 is connected to the parking area 51 via an exit gate 55. Further, a return gate 56 is provided between the pick-up area 53 and the parking area 51 for returning the autonomous driving vehicle 2 from the pick-up area 53 to the parking area 51. The return gate 56 is not essential.

In FIG. 2, the autonomous driving vehicles refer to an autonomous driving vehicle 2A stopped at the drop-off space 62 of the drop-off area 52, an autonomous driving vehicle 2B traveling within the parking lot 50, an autonomous driving vehicle 2C parked at the parking space 61 of the parking area 51, and an autonomous driving vehicle 2D parked at the pick-up space 63 of the pick-up area 53.

For example, after the autonomous driving vehicle 2 (corresponding to the autonomous driving vehicle 2A) that has entered the parking lot 50 drops off the occupant at the drop-off space 62, the automatic parking system 100 obtains the instruction authority for the autonomous driving vehicle 2 to start the automatic valet parking. The automatic parking system 100 causes the autonomous driving vehicle 2 (corresponding to the autonomous driving vehicle 2B) to travel toward the target parking space within the parking area 51, and the autonomous driving vehicle 2 (corresponding to the autonomous driving vehicle 2C) to be parked at the target parking space. The automatic parking system 100 causes the autonomous driving vehicle 2 (corresponding to the autonomous driving vehicle 2D) that is parked to travel toward the pick-up area 53 in response to a pick-up request and to wait at the pick-up space 63 for the occupant to arrive.

The automatic parking system 100 issues an autonomous travel reservation instruction for causing the autonomous driving vehicle 2 to autonomously travel along the target route when the communication with the autonomous driving vehicle 2 subject to the automatic valet parking is interrupted. Details of the autonomous travel reservation instruction will be described later.

Configuration of Automatic Parking System

Hereinafter, a configuration of the automatic parking system 100 will be described with reference to the drawings. As shown in FIG. 1, the automatic parking system 100 includes the parking lot management server 1. The parking lot management server 1 is a server for managing the parking lot.

The parking lot management server 1 is configured to communicate with the autonomous driving vehicle 2 and a user terminal 3. Details of the autonomous driving vehicle 2 and the user terminal 3 will be described later. The parking lot management server 1 may be provided in the parking lot or may be provided in a facility away from the parking lot. The parking lot management server 1 may be configured by a plurality of computers provided at different locations.

The parking lot management server 1 is connected to a parking lot sensor 4 and a parking lot map database 5. The parking lot sensor 4 is a sensor for recognizing a situation in the parking lot 50. The parking lot sensor 4 includes a vacancy sensor for detecting whether there is a parked vehicle in each parking space (whether each parking space is full or vacant).

The vacancy sensor may be provided for each parking space, or may be provided on, for example, a ceiling so as to be able to monitor a plurality of parking spaces with a single sensor. A configuration of the vacancy sensor is not particularly limited, and other known configurations can be adopted. The vacancy sensor may be a pressure sensor, a radar sensor or a sonar sensor using radio waves, or a camera. The vacancy sensor transmits detected information of the parked vehicle in the parking space to the parking lot management server 1.

The parking lot sensor 4 may include a surveillance camera for detecting the autonomous driving vehicle 2 traveling on a traveling path of the parking lot 50. The surveillance camera is provided on a ceiling or a wall of the parking lot, and captures an image of the autonomous driving vehicle 2 while traveling. The surveillance camera transmits the captured image to the parking lot management server 1.

The parking lot map database 5 is a database that records parking lot map information. The parking lot map information includes location information of the parking space within the parking lot, location information of the drop-off space, location information of the pick-up space, and information on the traveling path within the parking lot. Further, the parking lot map information includes location information of the landmark used by the autonomous driving vehicle 2 for location recognition. The landmark will be described later.

Figure 3:
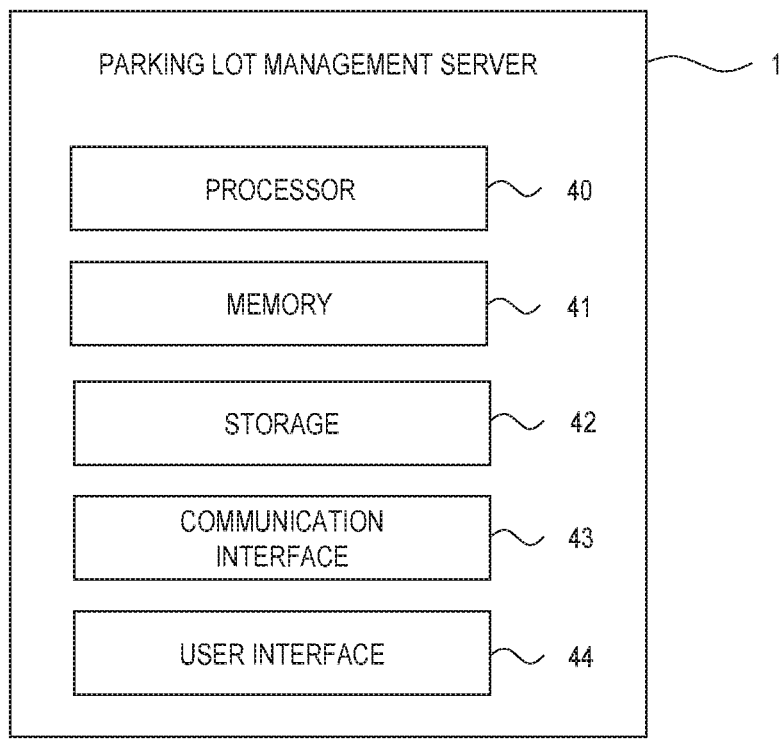
FIG. 3 is a block diagram illustrating one example of a hardware configuration of a parking lot management server.

A hardware configuration of the parking lot management server 1 will be described. FIG. 3 is a block diagram illustrating one example of a hardware configuration of the parking lot management server. As shown in FIG. 3, the parking lot management server 1 is configured as a general computer including a processor 40, a memory 41, a storage 42, a communication interface 43 and a user interface 44.

The processor 40 controls the parking lot management server 1 by operating various operating systems. The processor 40 is an arithmetic unit such as a central processing unit (CPU) including a control device, an arithmetic device, and a register. The processor 40 collectively controls the memory 41, the storage 42, the communication interface 43, and the user interface 44. The memory 41 is a recording medium such as a ROM (read only memory), a RAM (random access memory), or the like. The storage 42 is a recording medium such as a hard disk drive (HDD).

The communication interface 43 is a communication device for performing wireless communication via a network. Examples of the communication interface 43 include a network device, a network controller, a network card, and the like. The parking lot management server 1 communicates with the autonomous driving vehicle 2 and the user terminal 3 using the communication interface 43. The user interface 44 is an input/output unit of the parking lot management server 1 used by, for example, an administrator of the parking lot management server 1. The user interface 44 includes an output device such as a display or a speaker, and an input device such as a touchscreen.

A functional configuration of the parking lot management server 1 will be described. As illustrated in FIG. 1, the parking lot management server 1 includes a vehicle information acquisition unit 11, a vehicle situation recognition unit 12, an instruction change target vehicle specifying unit 13, and a vehicle instruction unit 14.

The vehicle information acquisition unit 11 acquires vehicle information of the autonomous driving vehicle 2 through communication with the autonomous driving vehicle 2 subject to the automatic valet parking. The vehicle information includes identification information of the autonomous driving vehicle 2 and location information of the autonomous driving vehicle 2 within the parking lot. The identification information may be any information as long as it can identify each of the autonomous driving vehicles 2. The identification information may be, for example, an ID number, a vehicle number, or a reservation number for the automatic valet parking.

The vehicle information may include the type of autonomous driving vehicle 2 or may include a vehicle number separate from the identification information. The vehicle information may include enter reservation information such as an enter reservation time, or may include an exit reservation time. The vehicle information may include vehicle body information such as a turning radius and a vehicle width of the autonomous driving vehicle 2, or may include information on the automatic driving function of the autonomous driving vehicle 2. The information on the automatic driving function may include information on the version of the automatic driving.

Further, the vehicle information may include recognition results of the external environment and traveling state of the autonomous driving vehicle 2. The recognition of the external environment and the traveling state will be described later. The vehicle information may include information on remaining mileage or remaining fuel of the autonomous driving vehicle 2. The vehicle information may include failure information of the autonomous driving vehicle 2. The failure information is information on abnormalities that have occurred in the autonomous driving vehicle 2.

The vehicle information acquisition unit 11 continuously acquires the vehicle information from the autonomous driving vehicle 2 during the automatic valet parking. In a case where the autonomous driving vehicle 2 is parked, the vehicle information acquisition unit 11 may stop acquiring the vehicle information, or may continue to regularly acquire the vehicle information.

The vehicle situation recognition unit 12 recognizes the situation of the autonomous driving vehicle 2 during the automatic valet parking based on the vehicle information acquired by the vehicle information acquisition unit 11. The situation of the autonomous driving vehicle 2 includes a location of the autonomous driving vehicle 2 within the parking lot. The situation of the autonomous driving vehicle 2 includes a communication status between the parking lot management server 1 and the autonomous driving vehicle 2.

The vehicle situation recognition unit 12 determines whether or not the communication between the parking lot management server 1 and the autonomous driving vehicle 2 has been interrupted. A method for determining whether the communication has been interrupted is not particularly limited, and other known methods can be adopted. For example, in a case where a situation in which the communication with the autonomous driving vehicle 2 is unavailable for at least a certain period of time, the vehicle situation recognition unit 12 determines that the communication has been interrupted. The vehicle situation recognition unit 12 may determine that the communication has been interrupted in a case where a situation in which a communication speed with the autonomous driving vehicle 2 is less than an interruption determination threshold has continued for at least a certain period of time. The interruption determination threshold is a threshold of a preset value. In a case where it is determined that the communication has been interrupted, the vehicle situation recognition unit 12 recognizes that the failed vehicle exists due to the communication interruption.

In a case where the vehicle situation recognition unit 12 recognizes that the failed vehicle exists due to the communication interruption, the instruction change target vehicle specifying unit 13 specifies an instruction change target vehicle, based on the locations of normal autonomous driving vehicles (locations within the parking lot), each of which is an autonomous driving vehicle 2 other than the failed vehicle, from among the normal autonomous driving vehicles. The instruction change target vehicle is a normal autonomous driving vehicle for which the instruction will be changed due to the failed vehicle. The location of the normal autonomous driving vehicle is recognized by the vehicle situation recognition unit 12.

The instruction change target vehicle specifying unit 13 specifies, for example, the normal autonomous driving vehicle located on a target route (a target route that the vehicle has not passed) of the failed vehicle as the instruction change target vehicle. Hereinafter, the target route of the failed vehicle is referred to as a failed-vehicle route.

The instruction change target vehicle specifying unit 13 may specify the normal autonomous driving vehicle expected to enter the failed-vehicle route as the instruction change target vehicle. The normal autonomous driving vehicle expected to enter the failed-vehicle route may be, for example, a normal autonomous driving vehicle of which a target route (a target route that the vehicle has not passed) instructed by the parking lot management server 1 intersects the failed-vehicle route.

Figure 4:
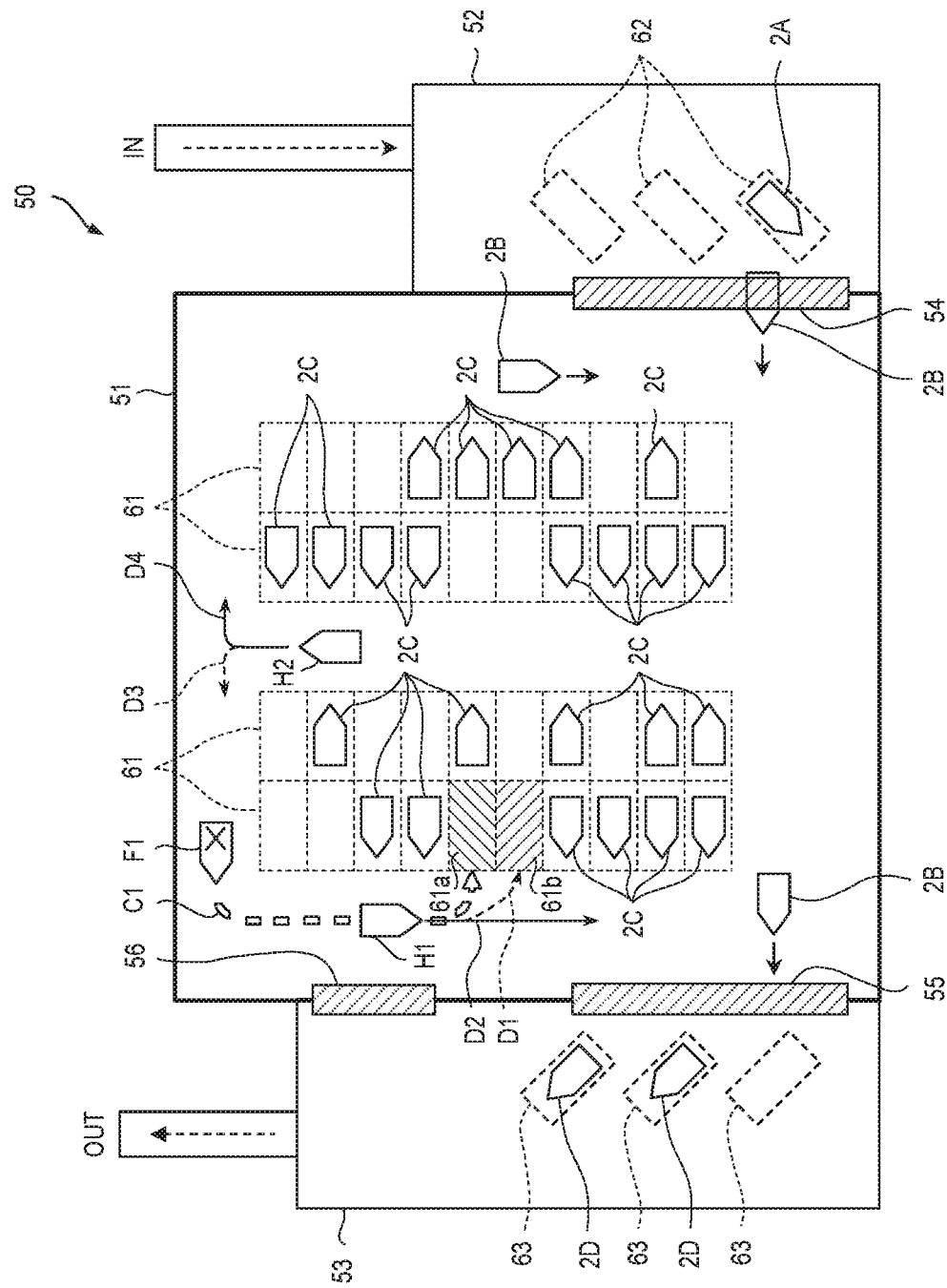
FIG. 4 is a plan view illustrating a situation in which a failed vehicle exists.

FIG. 4 is a plan view illustrating a situation in which a failed vehicle exists. FIG. 4 shows a failed vehicle F1 which has failed due to the communication interruption, a failed-vehicle route (target route of the failed vehicle F1) C1, a target parking space 61a of the failed vehicle, and instruction change target vehicles H1 and H2. FIG. 4 also shows a target route D1 before changing a route of the instruction change target vehicle H1, a target route D2 after changing a route of the instruction change target vehicle H1, a target parking space 61b before changing a route of the instruction change target vehicle H1, a target route D3 before changing a route of the instruction change target vehicle H2, and a target route D4 after changing a route of the instruction change target vehicle H2.

In the situation shown in FIG. 4, the instruction change target vehicle specifying unit 13 may specify, for example, a normal autonomous driving vehicle located on the failed-vehicle route C1 as the instruction change target vehicle H1. Further, the instruction change target vehicle specifying unit 13 specifies a normal autonomous driving vehicle expected to enter the failed-vehicle route C1 as the instruction change target vehicle H2.

The vehicle instruction unit 14 instructs the autonomous driving vehicle 2 that performs the automatic valet parking. In a case where the autonomous driving vehicle 2 starts the automatic valet parking, the vehicle instruction unit 14 directs the autonomous driving vehicle 2 to the target route for reaching the target parking space. A method for determining the target parking space is not particularly limited. The parking space may be allocated from the exit side in order in which the vehicle enters the parking lot, or the parking space may be allocated from the exit side in order of a departure reservation time. The target parking space may be designated by the user. The vehicle instruction unit 14 directs the autonomous driving vehicle 2 to the target route for reaching the pick-up space 63 when the autonomous driving vehicle 2 leaves the parking lot.

The vehicle instruction unit 14 calculates a target route with which the autonomous driving vehicle 2 reaches the target parking space from the location of the autonomous driving vehicle 2. The vehicle instruction unit 14 may calculate, for example, a route by which the vehicle can reach the target parking space with the shortest travel distance along the traveling path within the parking lot as the target route. The vehicle instruction unit 14 may calculate a new target route of the autonomous driving vehicle 2 so as not to intersect with the target route of another autonomous driving vehicle 2. The vehicle instruction unit 14 may determine the target parking space in consideration of the target route. The vehicle instruction unit 14 may also instruct an upper limit vehicle speed within the parking lot as well as the target route. The vehicle instruction unit 14 may instruct an upper limit acceleration. The upper limit vehicle speed and the upper limit acceleration are preset values.

The vehicle instruction unit 14 issues a pause instruction and an advance instruction in accordance with the situation of the other autonomous driving vehicles 2 recognized by the vehicle situation recognition unit 12. The pause instruction is an instruction to pause the autonomous driving vehicle 2. The advance instruction is an instruction to advance (start) the stopped autonomous driving vehicle 2. The vehicle instruction unit 14 may issue an instruction on deceleration or acceleration of the autonomous driving vehicle 2. The vehicle instruction unit 14 controls the stop and the advance of the autonomous driving vehicle 2 in accordance with the situation of the autonomous driving vehicle 2 so that the autonomous driving vehicle 2 can travel to the target parking space while avoiding approaching other autonomous driving vehicles 2.

The vehicle instruction unit 14 issues an autonomous travel reservation instruction to the autonomous driving vehicle 2 when, for example, the automatic valet parking is started. The autonomous travel reservation instruction is an instruction for causing the autonomous driving vehicle 2 to autonomously travel along the target route in a case where the communication between the parking lot management server 1 and the autonomous driving vehicle 2 is interrupted. The autonomous travel reservation instruction includes information on the target parking space of the autonomous driving vehicle 2 and information on all target routes to the target parking space.

In a case where the target route of the autonomous driving vehicle 2 is changed, the vehicle instruction unit 14 updates the target route of the autonomous driving vehicle 2 in the autonomous travel reservation instruction. Alternatively, in a case where the target route is changed by the instruction, the changed target route may be applied to the autonomous travel reservation instruction for the autonomous driving vehicle 2. In a case where the target parking space is changed, both the target route and the target parking space are updated. The autonomous travel reservation instruction may include an instruction to restrict the vehicle speed, i.e. a vehicle speed restriction instruction. The vehicle speed restriction instruction is, for example, an instruction to set the upper limit of the vehicle speed when the communication is interrupted to be lower than the upper limit vehicle speed set for the parking lot.

When the communication is interrupted, the vehicle information cannot be obtained from the failed vehicle, and thus the location of the failed vehicle cannot be accurately obtained. Further, the vehicle instruction unit 14 cannot issue the pause instruction to the failed vehicle in accordance with the situation of other autonomous driving vehicles 2 (situation of the normal autonomous driving vehicles). However, if all of the failed vehicles of which the communication has been interrupted are unconditionally stopped, the failed vehicles will obstruct the traveling path, and that may result in a decrease in efficiency of the automatic valet parking. Further, it is not appropriate to completely leave the autonomous driving vehicle 2 to travel without the instruction of the parking lot management server 1. The vehicle instruction unit 14 can cause the failed vehicle to travel along the target route instructed by the parking lot management server 1 by issuing the autonomous travel reservation instruction to the autonomous driving vehicle 2.

In the situation shown in FIG. 4, the failed vehicle F1 of which the communication has been interrupted autonomously travels in accordance with the autonomous travel reservation instruction. The failed vehicle F1 autonomously travels along the failed-vehicle route C1 and autonomously parks in the target parking space 61a.

The vehicle instruction unit 14 may issue the autonomous travel reservation instruction to the autonomous driving vehicle 2 when the autonomous driving vehicle 2 leaves the parking lot. In this case, the autonomous travel reservation instruction includes information on the pick-up space of the pick-up area where the autonomous driving vehicle 2 stops and information on all target routes to the pick-up space. In a case where the autonomous driving vehicle 2 leaves the parking lot, the vehicle instruction unit 14 may issue an interrupted communication stop reservation instruction instead of the autonomous travel reservation instruction.

In a case where the instruction change target vehicle is specified by the instruction change target vehicle specifying unit 13, the vehicle instruction unit 14 issues an instruction to the instruction change target vehicle. The vehicle instruction unit 14 may issue, for example, a route change instruction or an evacuation instruction to travel to get away from the failed-vehicle route to the instruction change target vehicle located on the failed-vehicle route.

The route change instruction to travel to get away from the failed-vehicle route is an instruction to change the target route of the instruction change target vehicle so as to travel to get away from the failed-vehicle route. In the route change instruction to travel to get away from the failed-vehicle route, for example, the target route of the instruction change target vehicle is changed so that the instruction change target vehicle first advances to the nearest intersection in front of the instruction change target vehicle and then the instruction change target vehicle advances at the intersection in a direction away from the failed-vehicle route. In a case where the traveling path includes a plurality of lanes, the instruction change target vehicle may travel to get away from the failed-vehicle route by changing lanes.

In the situation shown in FIG. 4, the vehicle instruction unit 14 issues the route change instruction to change the target route D1 to the target route D2, to the instruction change target vehicle H1 located on the failed-vehicle route C1 of the failed vehicle F1. The target route D2 is a target route for traveling to get away from the failed-vehicle route C1.

Further, the vehicle instruction unit 14 also changes the target parking space of the instruction change target vehicle H1 in the situation shown in FIG. 4. The vehicle instruction unit 14 changes the target parking space of the instruction change target vehicle from the target parking space 61b adjacent to the target parking space 61a of the failed vehicle F1 to a different position. As described above, even in a case where the instruction change target vehicle H1 can travel to get away from the failed-vehicle route C1 by traveling along the target route D1 before changing the route, when the target parking space 61b of the instruction change target vehicle H1 is adjacent to the target parking space 61a of the failed vehicle F1, the vehicle instruction unit 14 may change the target parking space to a location located away from the failed-vehicle route C1 since it is likely that the instruction change target vehicle H1 approaches the failed vehicle F1 during parking, such as swinging the front of the vehicle to begin backing up. The vehicle instruction unit 14 does not have to change the target parking space of the instruction change target vehicle H1.

The evacuation instruction is an instruction for evacuating to a location where the instruction change target vehicle does not interfere with the failed vehicle's travel, such as a vacant parking space or a side of the traveling path. The vehicle instruction unit 14 may issue the evacuation instruction that the instruction change target vehicle evacuates to a location across two adjacent parking spaces instead of a single parking space. The vehicle instruction unit 14 may issue the evacuation instruction that the instruction change target vehicle evacuates to a parking space where two adjacent, i.e. both the left and right sides, parking spaces are vacant (that is, the middle parking space of three vacant parking spaces). In the situation shown in FIG. 4, the vehicle instruction unit 14 may issue the evacuation instruction that the instruction change target vehicle H1 moves so as to stop next to the return gate 56 (pick-up area 53) on the traveling path.

In the evacuation instruction, the instruction change target vehicle stops after evacuation. In a case where it is determined, by the parking lot sensor 4 (vacancy sensor or surveillance camera), that the failed vehicle has been parked in the target parking space or the failed vehicle has been apart from the instruction change target vehicle by a certain distance, the vehicle instruction unit 14 may cancel the evacuation instruction and allow the instruction change target vehicle to return to the target route. The vehicle instruction unit 14 may notify an administrator of the parking lot that there is a failed vehicle, and the administrator may determine whether the instruction change target vehicle can return to the target route or not.

The vehicle instruction unit 14 issues, to the instruction change target vehicle expected to enter the failed-vehicle route, a route change instruction or a stop instruction not to enter the failed-vehicle route.

The route change instruction to not to enter the failed-vehicle route is an instruction to change the target route of the instruction change target vehicle such that the instruction change target vehicle does not enter the failed-vehicle route. In a case where there is a route by which the instruction change target vehicle can reach the target parking space without entering the failed-vehicle route, the vehicle instruction unit 14 issues the route change instruction using such a route as the target route of the instruction change target vehicle. In a case where there is no route by which the instruction change target vehicle can reach the target parking space without entering the failed-vehicle route, the vehicle instruction unit 14 issues a route change instruction that includes an instruction to change the target parking space.

Further, the vehicle instruction unit 14 changes the target route D3 of the instruction change target vehicle H2 to the target route D4 in the situation shown in FIG. 4. The target route D3 is a target route toward the failed-vehicle route C1. The target route D4 is a target route in a direction traveling to get away from the failed-vehicle route C1.

The stop instruction is an instruction to stop the instruction change target vehicle. In a case where the instruction change target vehicle leaves the parking lot but cannot reach the pick-up area without passing through the failed-vehicle route, the vehicle instruction unit 14 issues the stop instruction to the instruction change target vehicle. In a case where it is determined, by the parking lot sensor 4, that the failed vehicle has been parked or the failed vehicle has been apart from the instruction change target vehicle by a certain distance, the vehicle instruction unit 14 may cancel the stop instruction and allow the instruction change target vehicle to return to the target route. The vehicle instruction unit 14 may notify an administrator of the parking lot that there is a failed vehicle, and the administrator may determine whether the instruction change target vehicle can return to the target route or not.

Additionally, in a case where there is an instruction change target vehicle not located on the failed-vehicle route nor expected to enter the failed-vehicle route, the vehicle instruction unit 14 may issue the stop instruction or the route change instruction to travel to get away from the failed-vehicle route to such an instruction change target vehicle.

In a case where the vehicle situation recognition unit 12 recognizes that the failed vehicle. Which the failed vehicle due to the communication interruption exists the vehicle instruction unit 14 issues the interrupted communication stop reservation instruction to the normal autonomous driving vehicles each of which is an autonomous driving vehicle 2 other than the failed vehicle. The interrupted communication stop reservation instruction is an instruction for causing the normal autonomous driving vehicle to stop in a case where the communication between such a normal autonomous driving vehicle and the parking lot management server 1 is interrupted. The interrupted communication stop reservation instruction has priority over the autonomous travel reservation instruction. That is, the normal autonomous driving vehicle that has received the interrupted communication stop reservation instruction stops without autonomously traveling along the target route in a case where the communication is interrupted. Consequently, it is possible to avoid the troublesome situation in which a plurality of failed vehicles not instructed by the parking lot management server 1 autonomously travel.

The normal autonomous driving vehicle may autonomously evacuate and stop when the communication is interrupted. The interrupted communication stop reservation instruction may include an instruction for allowing, in advance, the vehicle to autonomously travel and evacuate under certain conditions. In a case where, for example, there are no vehicles, other than parked vehicles, or pedestrians within a certain distance, the normal autonomous driving vehicle may stop by the side of the traveling path.

In addition, the interrupted communication stop reservation instruction may include information on an evacuation space prepared within the parking lot in advance. In this case, the interrupted communication stop reservation instruction includes an instruction for allowing the normal autonomous driving vehicle of which the communication is interrupted to evacuate to the nearest evacuation space under certain conditions. For example, in a case where there are no vehicles, other than parked vehicles, or pedestrians within a certain distance, the normal autonomous driving vehicle may autonomously evacuate to the evacuation space and stop when a sensor thereof can detect that the evacuation space is vacant.

Figure 5:
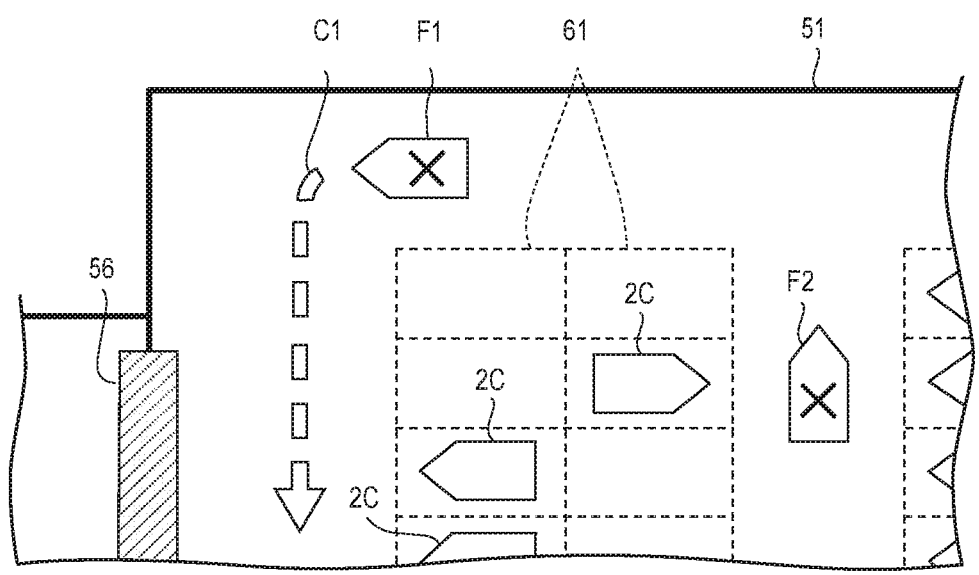
FIG. 5 is a plan view illustrating a situation in which a plurality of failed vehicles exist.

FIG. 5 is a plan view illustrating a situation in which a plurality of failed vehicle exist. FIG. 5 shows the failed vehicles F1 and F2. The failed vehicle F1 is a vehicle of which the communication has been interrupted first. The failed vehicle F2 is the autonomous driving vehicle 2 of which the communication has been interrupted after the communication of the failed vehicle F1 has been interrupted. It is assumed that the communication has been interrupted in the failed vehicle F2 after receiving the interrupted communication stop reservation instruction from the vehicle instruction unit 14.

In the situation shown in FIG. 5, the failed vehicle F1 of which the communication has been interrupted autonomously travels along the failed-vehicle route C1 in accordance with the autonomous travel reservation instruction. On the other hand, the failed vehicle F2 stops in accordance with the interrupted communication stop reservation instruction. The failed vehicle F2 may autonomously evacuate to a location where the failed vehicle F2 does not interfere with other vehicles, and stop.

In a case where it is determined, by the parking lot sensor 4 (vacancy sensor or surveillance camera), that the first failed vehicle has been parked in the target parking space, the vehicle instruction unit 14 may cancel the interrupted communication stop reservation instruction for the normal autonomous driving vehicle of which communication is available. In a case where the interrupted communication stop reservation instruction is canceled, the autonomous travel reservation instruction is executed when the communication is interrupted. The vehicle instruction unit 14 may notify the administrator of the parking lot that there is a failed vehicle, and the administrator may determine whether the interrupted communication stop reservation instruction should be canceled or not.

Further, the autonomous driving vehicle 2 and the user terminal 3, which communicate with the parking lot management server 1, will be described. The automatic parking system 100 according to the present embodiment does not have to include the autonomous driving vehicle 2 and the user terminal 3.

As shown in FIG. 1, the autonomous driving vehicle 2 has an automatic driving ECU 20 as one example. The automatic driving ECU 20 is an electronic control unit having a CPU, a ROM, a RAM, and the like. In the automatic driving ECU 20, for example, a program recorded in the ROM is loaded into the RAM, and various functions are implemented by executing the program loaded into the RAM by the CPU. The automatic driving ECU 20 may be configured by a plurality of electronic units.

The automatic driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 transmits and receives various types of information via communication with the parking lot management server 1. The communication unit 21 may transmit, for example, the vehicle information to the parking lot management server 1 and acquires information (for example, information of the landmark along the target route) required for the automatic valet parking from the parking lot management server 1. Further, the communication unit 21 communicates with the user terminal 3 associated with the autonomous driving vehicle 2.

The external sensor 22 is an in-vehicle sensor that detects an external environment of the autonomous driving vehicle 2. The external sensor 22 includes at least a camera. The camera is an imaging device that captures images of the external environment of the autonomous driving vehicle 2. The camera may be provided, for example, behind a windshield of the autonomous driving vehicle 2 and captures images of the front of the vehicle. The camera transmits imaging information on the external environment of the autonomous driving vehicle 2 to the automatic driving ECU 20. The camera may be a monocular camera or a stereo camera. A plurality of cameras may be provided, and images of the left and right sides and the back of the autonomous driving vehicle 2 may be captured in addition to the front of the vehicle.

The external sensor 22 may include a radar sensor. The radar sensor is a detection device that detects an object around the autonomous driving vehicle 2 using radio waves (for example, millimeter waves) or light. The radar sensor may include, for example, a millimeter-wave radar or a LIDAR (Light Detection and Ranging). The radar sensor transmits an electric wave or light to the surroundings of the autonomous driving vehicle 2 and detects an object by receiving the electric wave or light reflected by the object. The radar sensor transmits the detected object information to the automatic driving ECU 20. Further, the external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects vehicle speed of the autonomous driving vehicle 2. As the vehicle speed sensor, a wheel speed sensor that is provided for a wheel of the autonomous driving vehicle 2 or a drive shaft that rotates integrally with the wheel and detects rotation speed of each wheel can be used. The vehicle speed sensor transmits the detected vehicle speed information (wheel speed information) to the automatic driving ECU 20.

The acceleration sensor is a detector that detects acceleration of the autonomous driving vehicle 2. The acceleration sensor may include, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor may transmit, for example, acceleration information of the autonomous driving vehicle 2 to the automatic driving ECU 20. The yaw rate sensor is a detector that detects a yaw rate (rotational angular velocity) around a vertical axis of the center of gravity of the autonomous driving vehicle 2. For example, a gyro sensor can be used as the yaw rate sensor. The yaw rate sensor transmits the detected yaw rate information of the autonomous driving vehicle 2 to the automatic driving ECU 20.

The actuator 24 is a device used for controlling the autonomous driving vehicle 2. The actuator 24 includes at least a drive actuator, a brake actuator, and a steering actuator. The drive actuator controls the amount of air supplied to the engine (throttle opening degree) in accordance with a control signal from the automatic driving ECU 20 and controls the driving force of the autonomous driving vehicle 2. In a case where the autonomous driving vehicle 2 is a hybrid vehicle, a control signal from the automatic driving ECU 20 is input to a motor as a power source in addition to the air supplied to the engine to control the driving force. In a case where the autonomous driving vehicle 2 is an electric vehicle, the control signal from the automatic driving ECU 20 is input to the motor as the power source to control the driving force. The actuator 24 is configured by the motor as the power source in these cases.

The brake actuator controls a brake system according to the control signal from the automatic driving ECU 20 and controls the braking force applied to the wheels of the autonomous driving vehicle 2. Examples of the brake system include a hydraulic brake system. The steering actuator controls driving of an assist motor for controlling the steering torque in the electric power steering system in accordance with the control signal from the automatic driving ECU 20. Accordingly, the steering actuator controls the steering torque of the autonomous driving vehicle 2.

One example of a functional configuration of the automatic driving ECU 20 will be described. The automatic driving ECU 20 includes an external environment recognition unit 31, a traveling state recognition unit 32, a vehicle location recognition unit 33, a vehicle information providing unit 34, and a vehicle control unit 35.

The external environment recognition unit 31 recognizes the external environment of the autonomous driving vehicle 2 based on the detection results of the external sensor 22 (an image captured by the camera or object information detected by the radar sensor). The external environment includes a relative location of a surrounding object with respect to the autonomous driving vehicle 2. The external environment may include a relative speed and a moving direction of a surrounding object with respect to the autonomous driving vehicle 2. The external environment recognition unit 31 recognizes objects such as other vehicles or parking lot pillars by, for example, pattern matching. The external environment recognition unit 31 may recognize, for example, a parking lot gate, parking lot walls, poles and safety cones. In addition, the external environment recognition unit 31 may recognize a traveling boundary in the parking lot by white line recognition.

The traveling state recognition unit 32 recognizes the traveling state of the autonomous driving vehicle 2 based on the detection results of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the orientation of the autonomous driving vehicle 2 based on the yaw rate information of the yaw rate sensor.

The vehicle location recognition unit 33 recognizes the location of the autonomous driving vehicle 2 within the parking lot based on the parking lot map information obtained from the parking lot management server 1 through the communication unit 21 and the external environment recognized by the external environment recognition unit 31.

The vehicle location recognition unit 33 recognizes the location of the autonomous driving vehicle 2 within the parking lot based on location information of the landmark within the parking lot included in the parking lot map information, and relative location of the landmark for the autonomous driving vehicle 2 recognized by the external environment recognition unit 31. As the landmark, fixed objects provided in the parking lot can be used. At least one of, for example, parking lot pillars, parking lot walls, poles and safety cones can be used as the landmark. A travel boundary may be used as the landmark.

Alternatively, the vehicle location recognition unit 33 may recognize the location of the autonomous driving vehicle 2 by dead reckoning based on the detection results of the internal sensor 23. Further, the vehicle location recognition unit 33 may recognize the location of the autonomous driving vehicle 2 by communicating with a beacon installed in the parking lot.

The vehicle information providing unit 34 provides the vehicle information to the parking lot management server 1 through the communication unit 21. The vehicle information providing unit 34 provides, to the parking lot management server 1, for example, the vehicle information including the information on the location of the autonomous driving vehicle 2 within the parking lot recognized by the vehicle location recognition unit 33 at regular intervals.

The vehicle control unit 35 executes the automatic driving of the autonomous driving vehicle 2. In the automatic driving, the autonomous driving vehicle 2 autonomously travels along the target route instructed by the parking lot management server 1. The vehicle control unit 35 generates a course of the autonomous driving vehicle 2 based on, for example, the target route, the location of the autonomous driving vehicle 2, the external environment of the autonomous driving vehicle 2, and the traveling state of the autonomous driving vehicle 2. The course corresponds to a travel plan for automatic driving. The course includes a path along which the vehicle travels during the automatic driving and a vehicle speed plan in the automatic driving.

The path is a trajectory along which the vehicle autonomously travels on the target route. The path can be, for example, data (steering angle plan) indicating change in the steering angle of the autonomous driving vehicle 2 in accordance with a position on the target route. The position on the target route may be, for example, a set vertical position set at predetermined intervals (for example, 1 m) in the traveling direction of the target route. The steering angle plan is data in which a target steering angle is associated with each set vertical position.

The vehicle control unit 35 generates the course so as to, for example, pass through the center of the traveling path of the parking lot along the target route. In a case where the upper limit vehicle speed is instructed from the parking lot management server 1, the vehicle control unit 35 generates the course such that the vehicle speed plan does not exceed the upper limit vehicle speed. The vehicle control unit 35 may generate the course using the parking lot map information acquired by communicating with the parking lot management server 1.

In a case where the pause instruction is received from the parking lot management server 1, the vehicle control unit 35 stops the autonomous driving vehicle 2. In a case where the advance instruction is received from the parking lot management server 1, the vehicle control unit 35 advances the autonomous driving vehicle 2.

The vehicle control unit 35 determines whether or not the communication between the autonomous driving vehicle 2 and the parking lot management server 1 has been interrupted. A method for determining whether communication has been interrupted is not particularly limited, and other known methods may be adopted. For example, in a case where a situation in which the communication with the parking lot management server 1 is unavailable for at least a certain period of time, the vehicle control unit 35 determines that the communication has been interrupted.

The vehicle control unit 35 causes the autonomous driving vehicle 2 (failed vehicle) to travel along the target route in accordance with the autonomous travel reservation instruction in a case where the communication between the autonomous driving vehicle 2 and the parking lot management server 1 is interrupted. Also in this case, the vehicle control unit 35 generates the course so as to avoid objects such as pillars based on the external environment of the autonomous driving vehicle 2 and the traveling state of the autonomous driving vehicle 2. The vehicle control unit 35 causes the autonomous driving vehicle 2 to travel along the course and park in the target parking space in accordance with the autonomous travel reservation instruction.

In a case where the autonomous driving vehicle 2 receives the interrupted communication stop reservation instruction, when the communication is interrupted, the vehicle control unit 35 stops the autonomous driving vehicle 2 in accordance with the interrupted communication stop reservation instruction. In a case where it is permitted by the interrupted communication stop reservation instruction, the vehicle control unit 35 causes the autonomous driving vehicle 2 to evacuate and then stop. One example of the configuration of the autonomous driving vehicle 2 has been described above, the autonomous driving vehicle 2 may have, however, any configuration as long as the automatic valet parking can be implemented in accordance with the instruction from the parking lot management server 1 and autonomous travel in accordance with the autonomous travel reservation instruction. One example of the configuration of the autonomous driving vehicle 2 has been described above, the autonomous driving vehicle 2 is, however, not limited to such an example as long as the autonomous driving vehicle 2 is capable of implementing the automatic valet parking.

Further, the user terminal 3 is a portable information terminal owned by the user and associated with the autonomous driving vehicle 2. The user terminal 3 is registered in the autonomous driving vehicle 2 as, for example, a terminal of the owner of the autonomous driving vehicle 2. The user terminal 3 may be a terminal of the user who is registered in the autonomous driving vehicle 2 as a temporary owner by rental, or an authorized user by a transfer of instruction authority from the owner. The user terminal 3 is configured by, for example, a computer including a processor such as a CPU, a memory such as a ROM or a RAM, and a user interface including a display and a touchscreen.

The user terminal 3 has a function of issuing a parking request and a pick-up request to the parking lot management server 1. By operating the user terminal 3, the user can issue the parking request and the pick-up request as the automatic valet parking. The user grants the instruction authority of the autonomous driving vehicle 2 to the parking lot management server 1 by, for example, stopping the autonomous driving vehicle 2 at the drop-off space 62 of the drop-off area 52 within the parking lot 50, alighting the autonomous driving vehicle 2, operating the user terminal 3, and issuing the parking request.

The user issues the pick-up request to cause the autonomous driving vehicle 2 parked in the parking space 61 via the parking lot management server 1 to travel to the pick-up space 63 of the pick-up area 53 via the parking lot management server 1. The autonomous driving vehicle 2 waits for the user in the pick-up space 63. In a case where, for example, the autonomous driving vehicle 2 arrives at the pick-up space 63 and stops, the parking lot management server 1 waives the instruction authority for the autonomous driving vehicle 2. The instruction authority may be waived when the user issues an instruction to open a door of the autonomous driving vehicle 2 or start the autonomous driving vehicle 2. The instruction authority may be waived by the autonomous driving vehicle 2. The operation of the autonomous driving vehicle 2 caused by the parking request and the pick-up request is not limited to the description stated above. The same shall apply to the parking lot management server 1.

Processing of Automatic Parking System

Figure 6A:
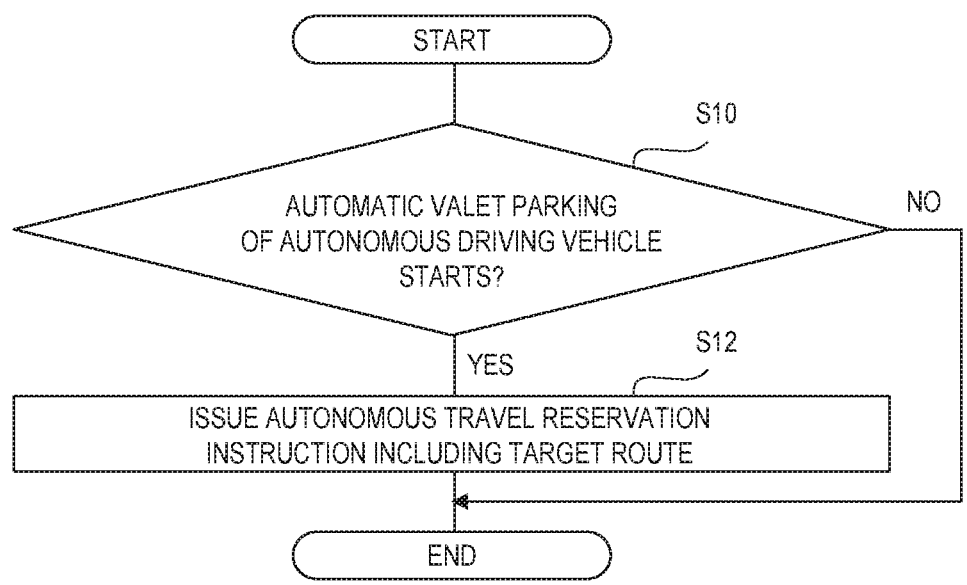
FIG. 6A is a flowchart illustrating one example of an autonomous travel reservation instruction process.

Hereinafter, a processing of the automatic parking system 100 will be described with reference to the drawings. FIG. 6A is a flowchart illustrating one example of an autonomous travel reservation instruction processing. The autonomous travel reservation instruction process is executed, for example, in a case where the autonomous driving vehicle 2 that can communicate with the parking lot management server 1 enters the parking lot.

As shown in FIG. 6A, the parking lot management server 1 of the automatic parking system 100 determines in S10 whether or not the automatic valet parking of the autonomous driving vehicle 2 has been started. The parking lot management server 1 may determine that the automatic valet parking has been started, for example, when the instruction authority for the autonomous driving vehicle 2 is granted. When it is determined that the automatic valet parking is started (S10: YES), the parking lot management server 1 proceeds to S12. When it is not determined that the automatic valet parking is started (S10: NO), the parking lot management server 1 ends the processing. The parking lot management server 1 repeats the determination of S10 again after a predetermined time has elapsed.

In S12, the parking lot management server 1 issues, to the autonomous driving vehicle 2, the autonomous travel reservation instruction including the target route by the vehicle instruction unit 14. The autonomous travel reservation instruction includes information on the target parking space of the autonomous driving vehicle 2 and information on all target routes to the target parking space.

Figure 6B:
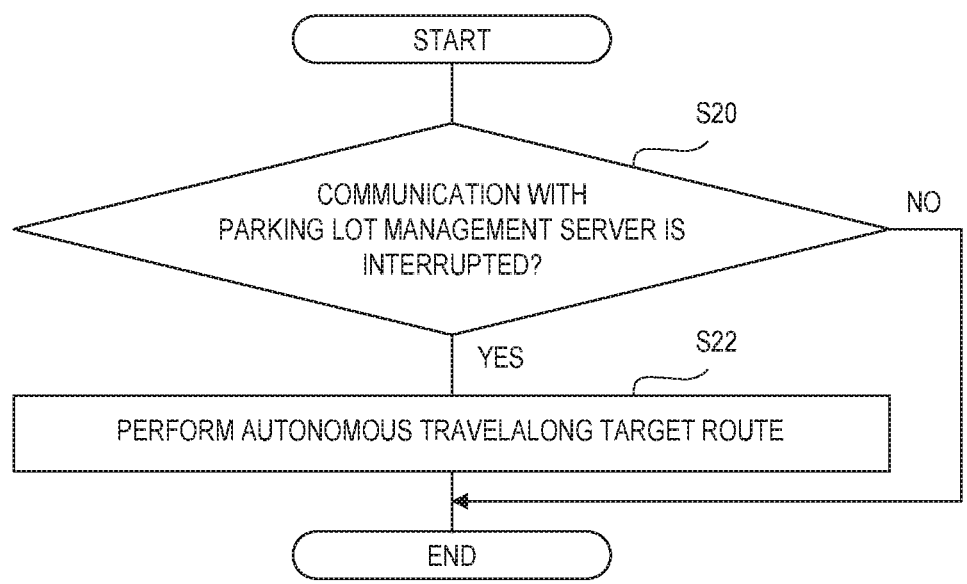
FIG. 6B is a flowchart illustrating one example of an autonomous travel start process.

FIG. 6B is a flowchart illustrating one example of an autonomous travel start process in the autonomous driving vehicle 2. The autonomous travel start process is executed when the vehicle travels in accordance with the instruction from the parking lot management server 1 by the automatic valet parking.

As shown in FIG. 6B, the automatic driving ECU 20 of the autonomous driving vehicle 2 determines in S20 whether or not the communication with the parking lot management server 1 has been interrupted. In a case where, for example, a situation in which the communication with the parking lot management server 1 is unavailable for at least a certain period of time, the automatic driving ECU 20 determines that the communication with the parking lot management server 1 has been interrupted. When it is determined that the communication with the parking lot management server 1 has been interrupted (S20: YES), the automatic driving ECU 20 proceeds to S22. When it is not determined that the communication with the parking lot management server 1 has been interrupted (S20: NO), the automatic driving ECU 20 ends the processing. The automatic driving ECU 20 repeats the determination of S20 again after a predetermined time has elapsed.

In S22, the automatic driving ECU 20 causes the vehicle control unit 35 to perform the autonomous travel along the target route. The vehicle control unit 35 causes the autonomous driving vehicle 2 (failed vehicle) to travel along the target route and parks the vehicle in the target parking space in accordance with the autonomous travel reservation instruction.

Further, the vehicle control unit 35 causes the autonomous driving vehicle 2 to travel along the target route to the pick-up space, in a case where the autonomous driving vehicle 2 leaves the parking lot, based on the information on the pick-up space and the information on all target routes to the pick-up space, included in the autonomous travel reservation instruction. In a case where the interrupted communication stop reservation instruction is received, the vehicle control unit 35 stops the autonomous driving vehicle 2 without autonomously traveling in S22. The vehicle control unit 35 may evacuate and stop the autonomous driving vehicle 2.

FIG. 7 is a flowchart illustrating one example of an instruction change process in the parking lot management server 1. The parking lot management server 1 executes the instruction change process during, for example, the automatic valet parking.

As shown in FIG. 7, the parking lot management server 1 determines in S30, by the vehicle situation recognition unit 12, whether or not the communication with the autonomous driving vehicle 2 has been interrupted. For example, in a case where a situation in which the communication with the autonomous driving vehicle 2 is unavailable for at least a certain period of time, the vehicle situation recognition unit 12 determines that the communication has been interrupted. When it is determined that the communication with the autonomous driving vehicle 2 has been interrupted (S30: YES), the parking lot management server 1 proceeds to S32. When it is not determined that the communication with the autonomous driving vehicle 2 has been interrupted (S30: NO), the parking lot management server 1 ends the processing. The parking lot management server 1 repeats the determination of S30 again after a predetermined time has elapsed.

In S32, the parking lot management server 1 issues the interrupted communication stop reservation instruction to the normal autonomous driving vehicle by the vehicle instruction unit 14. As an example, the vehicle instruction unit 14 issues the interrupted communication stop reservation instruction to all normal autonomous driving vehicles other than the failed vehicle.

In S34, the parking lot management server 1 recognizes, by the vehicle situation recognition unit 12, the location of the normal autonomous driving vehicle. The vehicle situation recognition unit 12 recognizes the situation of the normal autonomous driving vehicle based on the vehicle information acquired by the vehicle information acquisition unit 11.

In S36, the parking lot management server 1 specifies the instruction change target vehicle by the instruction change target vehicle specifying unit 13. The instruction change target vehicle specifying unit 13 specifies the instruction change target vehicle based on the location of the normal autonomous driving vehicle that is the autonomous driving vehicle 2 other than the failed vehicle. The instruction change target vehicle specifying unit 13 specifies the normal autonomous driving vehicle located on a target route of the failed vehicle as the instruction change target vehicle, for example, using the location of the normal autonomous driving vehicle and the failed-vehicle route. The instruction change target vehicle specifying unit 13 may specify the normal autonomous driving vehicle expected to enter the failed-vehicle route as the instruction change target vehicle. The parking lot management server 1 may end the processing in a case where the instruction change target vehicle is not specified.

In S38, the parking lot management server 1 issues the instruction (stop instruction, evacuation instruction or route change instruction) to the instruction change target vehicle by the vehicle instruction unit 14. The vehicle instruction unit 14 issues the route change instruction or the evacuation instruction to travel to get away from the failed-vehicle route to the instruction change target vehicle, in a case where the instruction change target vehicle is located on the failed-vehicle route. The vehicle instruction unit 14 issues the route change instruction or the stop instruction, such that the vehicle does not enter the failed-vehicle route, to the instruction change target vehicle, in a case where the instruction change target vehicle is expected to enter the failed-vehicle route. Thereafter, the parking lot management server 1 ends the processing.

According to the automatic parking system 100 of the present embodiment stated above, the autonomous travel reservation instruction for causing the autonomous driving vehicle 2 to autonomously travel along the target route is performed when the communication is interrupted. Therefore, compared to a case where the autonomous driving vehicle 2 is always stopped when the communication is interrupted, it is possible to improve the parking efficiency of the automatic valet parking by autonomously traveling the failed vehicle of which the communication is interrupted.

Further, according to the automatic parking system 100, by issuing the route change instruction or the evacuation instruction such that the normal autonomous driving vehicle on the target route of the failed vehicle that may autonomously travel to get away from the target route of the failed vehicle, it is less likely that the normal autonomous driving vehicle collides with the failed vehicle not instructed by the parking lot management server 1. Similarly, according to the automatic parking system 100, by issuing the route change instruction or the stop instruction such that the normal autonomous driving vehicle expected to enter the target route of the failed vehicle that may autonomously travel does not enter the target route of the failed vehicle, it is less likely that the normal autonomous driving vehicle collides with the failed vehicle not instructed by the parking lot management server 1.

Further, according to this automatic parking system 100, the interrupted communication stop reservation instruction is issued for the normal autonomous driving vehicle when a failed vehicle exists, and the interrupted communication stop reservation instruction has priority, whereby it is possible to prevent the parking lot from being packed even when a plurality of failed vehicles autonomously travel.

The embodiments of the present disclosure have been described above, but the present disclosure is not limited to the embodiments stated above. The present disclosure can be implemented in various forms including various modifications and improvements made on the embodiments stated above, based on the knowledge of those skilled in the art.

The parking lot management server 1 does not have to be able to directly communicate with the autonomous driving vehicle 2, but may communicate with the autonomous driving vehicle 2 via, for example, another server. The parking lot management server 1 may communicate with the autonomous driving vehicle 2 via, for example, a management server of the manufacturer of the autonomous driving vehicle 2 or an operation server of MaaS (Mobility as a Service). In this case, the determination of whether the communication has been interrupted may be made in the server via which the parking lot management server 1 communicates with the autonomous driving vehicle 2.

The instruction change target vehicle specifying unit 13 does not have to specify the instruction change target vehicle using the failed-vehicle route. The instruction change target vehicle specifying unit 13 may specify all normal autonomous driving vehicles traveling within the parking area 51 as the instruction change target vehicles.

The instruction change target vehicle specifying unit 13 may specify the instruction change target vehicle based on the location of the failed vehicle when the communication is interrupted and the location of the normal autonomous driving vehicle. The instruction change target vehicle specifying unit 13 may specify the normal autonomous driving vehicle within a certain range from the location of the failed vehicle when the communication is interrupted as the instruction change target vehicle. In a case where the parking lot is divided into several sections, the instruction change target vehicle specifying unit 13 may specify the normal autonomous driving vehicle included in a section where the failed vehicle exists as the instruction change target vehicle. The instruction change target vehicle specifying unit 13 may specify the normal autonomous driving vehicle expected to enter the section where the failed vehicle exists as the instruction change target vehicle, in addition to the normal autonomous driving vehicle included in the section where the failed vehicle exists.

Further, the instruction change target vehicle specifying unit 13 may estimate the current location of the failed vehicle within the parking lot from the captured images of the failed vehicle, captured by the surveillance camera that is the parking lot sensor 4. The instruction change target vehicle specifying unit 13 may specify the normal autonomous driving vehicle within a certain range from the estimated current location of the failed vehicle as the instruction change target vehicle. Further, the instruction change target vehicle specifying unit 13 may specify the normal autonomous driving vehicle included in all sections that the failed-vehicle route passes through as the instruction change target vehicle, or alternatively, may specify the normal autonomous driving vehicle expected to enter all sections that the failed-vehicle route passes through as the instruction change target vehicle.

The vehicle instruction unit 14 does not have to issue the interrupted communication stop reservation instruction to all normal autonomous driving vehicles other than the failed vehicle. In a case where the parking lot is divided into several sections, the vehicle instruction unit 14 may issue, for example, the interrupted communication stop reservation instruction to the normal autonomous driving vehicle included in a section where the failed vehicle exists. The vehicle instruction unit 14 may issue the interrupted communication stop reservation instruction to the normal autonomous driving vehicle expected to enter the section where the failed vehicle exists, in addition to the normal autonomous driving vehicle included in the section where the failed vehicle exists.

The vehicle instruction unit 14 may issue the interrupted communication stop reservation instruction to the normal autonomous driving vehicle included in all sections that the failed-vehicle route that is the target route of the failed vehicle passes through. Further, the vehicle instruction unit 14 may issue the interrupted communication stop reservation instruction to the normal autonomous driving vehicle expected to enter all sections that the failed-vehicle route that is the target route of the failed vehicle passes through.

The vehicle instruction unit 14 does not have to issue the interrupted communication stop reservation instruction. The vehicle instruction unit 14 may allow a plurality of failed vehicles to autonomously travel.

The parking lot management server 1 may transmit, to the user terminal 3 owned by the user of the failed vehicle, a notification that the communication is interrupted in a case where the communication interruption of the failed vehicle continues for at least a predetermined time. In a case where the failed vehicle is autonomously parked in the target parking space, the parking lot management server 1 may notify the user terminal 3 owned by the user of the failed vehicle that the failed vehicle has been parked. Further, the parking lot management server 1 does not have to be able to communicate with the user terminal 3.

What is claimed is:

1. An automatic parking system that instructs a plurality of autonomous driving vehicles in a parking lot such that each of the autonomous driving vehicles travels along a target route and parks in a target parking space within the parking lot, the automatic parking system comprising a server configured to:
- direct an autonomous driving vehicle along the target route, and to issue a pause instruction and an advance instruction to the autonomous driving vehicle traveling along the target route,
- issue an autonomous travel reservation instruction for causing the autonomous driving vehicle to autonomously travel along the target route when communication with the autonomous driving vehicle is interrupted, and
- when a failed vehicle that is the autonomous driving vehicle of which communication is interrupted exists, and a normal autonomous driving vehicle that is the autonomous driving vehicle other than the failed vehicle has a target parking space adjacent to the target parking space of the failed vehicle, change the target parking space of the normal autonomous driving vehicle to a different position, and change a route of the normal autonomous driving vehicle to get away from the target route of the failed vehicle and arrive at the different position.

2. The automatic parking system according to claim 1, wherein the server is configured to, when the failed vehicle that is the autonomous driving vehicle of which communication is interrupted exists, issue a route change instruction or an evacuation instruction to the normal autonomous driving vehicle that is the autonomous driving vehicle other than the failed vehicle, based on a location of the normal autonomous driving vehicle, such that the normal autonomous driving vehicle located on the target route of the failed vehicle travels to get away from the target route of the failed vehicle.

3. The automatic parking system according to claim 1, wherein the server is configured to, when the failed vehicle that is the autonomous driving vehicle of which communication is interrupted exists, issue a route change instruction or a stop instruction to the normal autonomous driving vehicle that is the autonomous driving vehicle other than the failed vehicle, based on a location of the normal autonomous driving vehicle, such that the normal autonomous driving vehicle expected to enter the target route of the failed vehicle does not enter the target route of the failed vehicle.

4. The automatic parking system according to claim 1, wherein the server is configured to, when the failed vehicle that is the autonomous driving vehicle of which communication is interrupted exists, issue an interrupted communication stop reservation instruction to the normal autonomous driving vehicle that is the autonomous driving vehicle other than the failed vehicle, such that the normal autonomous driving vehicle stops when the communication is interrupted, and
- the interrupted communication stop reservation instruction has priority over the autonomous travel reservation instruction.

5. A method to instruct a plurality of autonomous driving vehicles in a parking lot such that each of the autonomous driving vehicles travels along a target route and parks in a target parking space within the parking lot, the method comprising:
- directing an autonomous driving vehicle along the target route, and issuing a pause instruction and an advance instruction to the autonomous driving vehicle traveling along the target route;
- issuing an autonomous travel reservation instruction for causing the autonomous driving vehicle to autonomously travel along the target route when communication with the autonomous driving vehicle is interrupted and;
- when a failed vehicle that is the autonomous driving vehicle of which communication is interrupted exists, and a normal autonomous driving vehicle that is the autonomous driving vehicle other than the failed vehicle has a target parking space adjacent to the target parking space of the failed vehicle, changing the target parking space of the normal autonomous driving vehicle to a different position, and changing a route of the normal autonomous driving vehicle to get away from the target route of the failed vehicle and arrive at the different position.

* * * * *